United States Patent [19]
Leiber

[11] 3,797,892
[45] Mar. 19, 1974

[54] ANTILOCK CONTROL SYSTEM
[75] Inventor: Heinz Leiber, Leimen, Germany
[73] Assignee: Teldrix GmbH, Heidelberg, Germany
[22] Filed: Apr. 18, 1972
[21] Appl. No.: 245,134

[30] Foreign Application Priority Data
   Apr. 22, 1971   Germany............................ 2119590

[52] U.S. Cl............................... 303/21 EB, 303/20
[51] Int. Cl............................................... B60t 8/00
[58] Field of Search........... 188/181 C, 3 R; 303/20, 317/5; 324/161; 340/52 R, 263; 180/103–104 303/21, 7;

[56] References Cited
UNITED STATES PATENTS

| | | | |
|---|---|---|---|
| 3,583,773 | 6/1971 | Steinbrenner et al. | 303/20 X |
| 3,525,553 | 8/1970 | Carp et al. | 303/21 P |
| 3,288,232 | 11/1966 | Shepherd | 303/21 EB X |
| 3,398,995 | 8/1968 | Martin | 303/21 BE |
| 3,606,492 | 9/1971 | Hayes | 303/21 BE UX |

*Primary Examiner*—Duane A. Regar
*Assistant Examiner*—Stephen G. Kunin
*Attorney, Agent, or Firm*—Spencer & Kaye

[57] ABSTRACT

An antilock control system for controlling the braking pressure acting on the wheels of one vehicle axle comprises a sensing device for sensing the behavior of each wheel, two control arrangements for controlling the braking pressure, the first of which is actuated when both wheels exhibit a tendency to lock and the second of which is actuated when one of the wheels exhibits a tendency to lock and a switch device for switching from the first control arrangement to the second control arrangement when the vehicle is subjected to or is about to be subjected to transverse accelerations.

9 Claims, 2 Drawing Figures

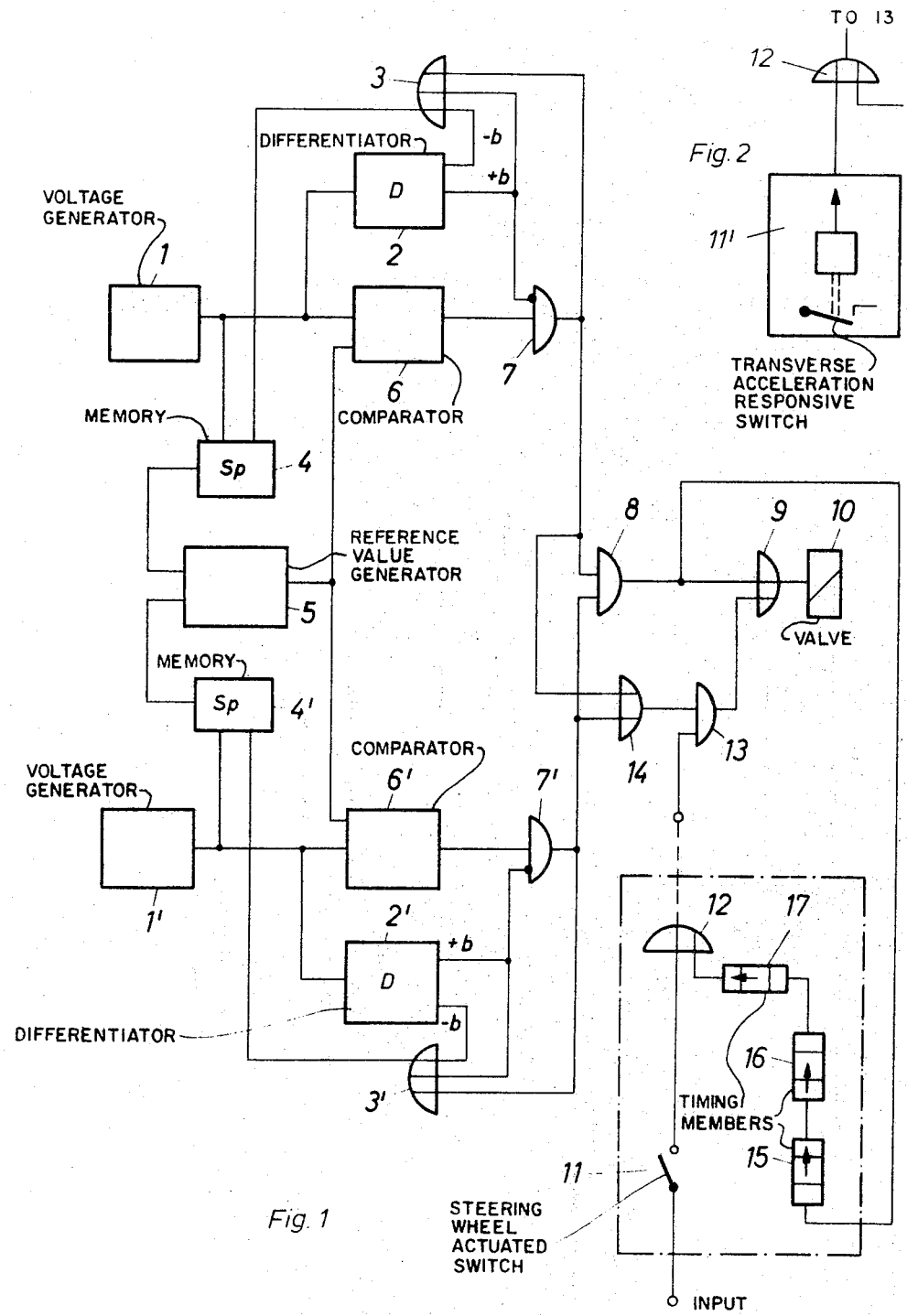

ANTILOCK CONTROL SYSTEM

BACKGROUND OF THE INVENTION

The invention relates to an antiskid control system for controlling the braking pressure on the wheels of one vehicle axle. In such systems, the tendency to lock the individual wheels (excess of a certain deceleration and possibly acceleration of the vehicle wheels and/or deviation of the wheel speeds from a reference value) is usually sensed by sensors, and when a tendency to lock is found, control signals are generated for varying the braking pressure.

Simple antilock control systems are known in which the lowering of the braking pressure is initiated if at least one of the vehicle wheels of an axle shows a tendency to lock (select low). This type of control has the disadvantage that the braking of the vehicle has not always an optimum value, i.e. the distance travelled by the vehicle is increased because a reduction in the braking pressure of both wheels may be initiated even at a time when the second wheel has not contributed substantially to the braking of the vehicle.

In addition, antilock control systems are known in which a reduction of the braking pressure is initiated only if both wheels of an axle deliver a signal indicating a tendency to lock (select high). In these systems, locking of a single wheel may occur, without any reduction in the braking pressure. The braking effect with this type of control is however better than that achieved with the control described above. This type of control cannot be used in practice because when braking in a curve is being carried out, this control substantially reduces the lateral stability.

For this reason, the separate control of all vehicle wheels has been adopted. However, with a four wheeled vehicle, this necessitates the use of four control channels, and this makes the system very expensive.

SUMMARY OF THE INVENTION

It is an object of the invention to provide a control system which is substantially cheaper and may, therefore, be used also on less expensive vehicles, whilst still avoiding the disadvantages of both known types of controls described above.

According to the invention there is provided an antilock control system for controlling the braking pressure acting on the wheels of one vehicle axle comprising sensing means for sensing the behavior of each wheel, first control means for controlling said braking pressure when said sensing means indicates a tendency to lock on the part of both wheels of said one vehicle axle, second control means for controlling said braking pressure when said sensing means indicates a tendency to lock on the part of one of said wheels of said one vehicle axle and switch means for switching from said first to said second control means when said vehicle is subjected to or is about to be subjected to transverse accelerations.

BRIEF DESCRIPTION OF THE DRAWINGS

The invention will now be described in greater detail, by way of example, with reference to the drawing, in which:

FIG. 1 is a block diagram of a control system according to the invention in which slip signals are used for the control, and the required reference value is produced only from the associated wheels, and FIG. 2 is partial diagram showing an alternative form of one part of the system of FIG. 1.

DESCRIPTION OF THE PREFERRED EMBODIMENT

Basically, the invention proposes that, in an antilock control system for controlling the braking pressure acting on the wheels of one vehicle axle, the braking pressure is controlled only, as known per se, when both wheels of the axle show a tendency to lock (select high) in normal conditions, and during the occurrence of, or in the case of expected transverse accelerations, another type of control is adopted in which the control is a function of sensor signals delivered by the wheel of the axle which first shows a tendency to lock (select low). Thus in normal conditions, therefore, the control system uses the control which of the two types of control gives the best braking performance (select high), whilst when travelling round bends, the only type of control permissible for such circumstances is adopted (select low). The switching between the controls may be effected, for example, by a mercury switch which switches at a given transverse acceleration of, e.g., 0.2 g. Alternatively it may be actuated as a result of movement of the vehicle steering wheel to a predetermined position.

The combined control is particularly intended for the wheel brakes of those vehicle axles which contribute only a relatively small braking effect in view of the construction of the brakes. More particularly, it is intended for the wheel brakes of the wheels of the rear axle of vehicles with front wheel drive.

Even during travel along a straight line, when braking is carried out for a long time, e.g. braking from high speeds, the locking of one of the wheels is undesirable owing to the increased wear of the corresponding tire, and the consequent reduction in the lateral stability. Thus, switching over from select high control to select low control may take place also when the select high control has been in operation in excess of a certain time (e.g. 1.5 seconds).

As mentioned above, the control of the braking pressure may be caused by deceleration and possibly by acceleration signals. However, it is possible to use slip signals for braking pressure control instead of, or in addition to these other signals. This requires a reference value with which the wheel speeds are compared. This reference value may be produced as known from the two wheel speeds. However, it is also possible to use the speeds of other wheels of the vehicle for forming a reference value in addition to the rotational speeds of the two wheels of the one axle.

For forming the reference value, an RC circuit may be provided, as known in the art, to which voltages proportional to the rotational wheel speeds are applied, and the capacitor of which always charges up to a value which is a function of the higher wheel speed. The capacitor discharges at a given slope. The voltage curve across the capacitor or a part thereof serves as reference value. However, the reference value may also be produced, for example, by storing the momentary wheel speeds of the individual wheels when a predetermined deceleration value is present and selecting the larger of the stored values. This value or a part thereof can then be used as the reference value. Apart from storing the speed value during the appearance of the predetermined deceleration value, the storing may also be effected when the rotational speed of a wheel deviates from the reference value by a predetermined amount.

Referring now to the drawings, in FIG. 1 blocks 1 and 1' represent sensors in the form of voltage generators which deliver voltages which are proportional to the rotational speeds of the two wheels of one axle, e.g. the rear axle of a vehicle with front wheel drive. The generation of these voltages is known and will not therefore be explained in detail. These voltages are applied to differentiating members 2 and 2' which deliver output voltages if the rotational speeds rise faster than specified value (+b) or drop faster than specified value (−b). These signals are applied through OR gates 3 and 3' to store elements 4 and 4', and cause storage therein of the output voltages from blocks 1 and 1' which output voltages are also supplied to these store elements. Thus in these store elements 4 and 4' is stored a value which is proportional to the momentary wheel speed of the associated wheel. In the block 5, the larger of the values stored in the stores 4 and 4' is selected and delivered to comparators 6 and 6' as a reference value. In the comparators 6 and 6', the reference value is compared with voltages corresponding to the momentary wheel speeds. Controllable stores corresponding to the stores 4 and 4' and comparison members corresponding to the comparators 6 and 6' are known, e.g. from the German Offenlegungsschrift 2 035 632, FIG. 1. Voltage generators corresponding to the voltage generators 1 and 1' and a circuit for the selection of the greater of two values corresponding to the block 5 are likewise known. No information is required for this. A circuit measuring the slip and corresponding to FIG. 1 is also disclosed in U.S. patent application, Ser. No: 222 780, filed Feb. 2, 1972, entitled "Control system", inventors: H. Leiber and A. Rode. If the value corresponding to the wheel speed deviates from the reference value by at least a predetermined amount, a voltage appears at the output of the comparator 6 or 6' which passes through an AND gate 7 or 7' to an AND gate 8 so long as no signal arrives from the output of the differentiating members 2 or 2' (the second input of the AND gates 7 and 7' are negated). If both AND gates 7 and 7' deliver a voltage into the AND gate 8, a voltage passes through the OR gate 9 to a two-way valve 10 which is switched over and lowers the hitherto rising brake pressure by releasing pressure fluid into a return conduit. Any voltage at the outputs of the AND gates 7 and 7', is also applied through the OR gate 3 or 3' to the store 4 or 4' and causes at each application of this voltage, renewed storage of a signal corresponding to the momentary wheel speed of the associated wheel. The AND gates 7 and 7', will, when the wheel speeds are found to deviate from the reference value in the members 6 and 6', prevent these voltages from being further transmitted if an input appears at the negated input of the AND gates 7 and 7' because of an acceleration of the wheel.

With the circuit elements described so far, the valve 10 is operated when the brake control has been initiated by a −b signal at the output of one of the differentiating members 2 and 2'. Thus when a value corresponding to the instantaneous rotational speed is stored, and the voltages corresponding to the speed of both wheels deviate from the reference value formed in 5 by at least a predetermined amount (select high), the valve 10 is operated.

A switch 11 is additionally provided which is closed, when the steering wheel is turned through a predetermined angle, and applies a voltage through an OR gate 12 to an AND gate 13. Instead of the steering wheel actuated switch 11, a transverse acceleration switch 11' (FIG. 2) can be used which, as long as a predetermined transverse acceleration (e.g. 0.2g) is exceeded, closes and voltage is applied to the AND gate 13 via the OR gate 12. A mercury switch may be used for this purpose. So long as the switch 11 or 11' is closed, voltage is applied through OR gate 14 and AND gate 13 to the OR gate 9 if at least one of the AND gates 7 and 7' delivers a voltage. Thus, in this state, any signal at the outputs of the members 7 and 7' may operate the valve 10 (select low). This state is, therefore, effective when the vehicle is turning.

The foregoing description of the invention may be summarized in a single paragraph as follows:

The AND gates 7 and 7' emit, independently from one another, a control signal when the particular wheel with which they are associated manifests a tendency to lock. The output of each AND gate 7, 7' is connected to inputs of a control means which, in the embodiment illustrated in FIG. 1, includes gates 8, 9, 13 and 14. The control means is connected to the valve 10 (which is a braking pressure reducing means associated with and simultaneously affecting all the wheels of the vehicle axle) for actuating the latter. The control means has a first state in which it operates the valve 10 only when there is a simultaneous emission of control signals by both AND gates 7 and 7', that is, all the wheels on the same axle simultaneously manifest a tendency to lock. The control means has a second state in which it operates the valve 10 when at least one of the AND gates 7, 7' emits a control signal, that is, at least one wheel of the axle manifests a tendency to lock. There is provided a switch means 11 which forms part of the control means for setting the latter into its first or its second state. The switch means 11 is of the type that responds directly (when it is, for example, a mercury switch) or indirectly (when it is, for example, a steering wheel-actuated switch) to a change from a straight line travel of the vehicle to a curved line travel thereof (and conversely). In this manner the control means, including the gates 8, 9, 13, 14 is set from its above-defined first state to its second state not later than when the vehicle is beginning to be subjected to transverse accelerations exceeding a predetermined value.

The output signal of the AND gate 8 which occurs during straight travel when both wheels show a tendency to lock, is applied also to the gates 15, 16, 17 to provide a timing function. Such timing members are known. Their mode of operation is obvious for example from German Standards, DIN 40 700, sheet 14, page 3, No. 4.4. When the output signal of the AND gate 8 lasts longer than a given time (e.g. 1.5 seconds) (timed by timing member 16) the OR gate 12 carries for a certain short period (timed by timing member 17) beyond end of the output voltage from the gate 8 a voltage, producing the same effect as the closed transverse acceleration switch 11, i.e. making effective a select low operation. The member 15 bridges breaks of very short duration at the output of the AND gate 8. The timing members 15 to 17 ensure that the locked wheel rotates periodically for brief periods, thereby preventing tire wear at only one point. Such a case may occur, e.g., during emergency braking at high speeds. Under these conditions it may happen that, for example, one wheel locks and the other shows a tendency to lock for a certain time. In this state, the braking pressure is relieved and finally one of the wheels will have a permissible slip. This would cause the braking pressure to build up again in spite of the continued locking of the other wheel. However, if the signal at the output of the AND gate 8 has lasted for a certain time, a further pressure drop for a certain period is produced by the members 15 to 17. The fact that the voltage at the output of the AND gate 8 has lasted for the given time, indicates that the emergency braking has lasted for a given time, e.g. because the braking has been carried out from a high speed where long duration locking of one wheel is not desirable.

It will be understood that the above description of the present invention is susceptible to various modification changes and adaptations.

What is claimed is:

1. An antilock control system for controlling the braking pressure acting on the wheels of one vehicle axle, comprising in combination:
   a. braking pressure reducing means coupled to all the wheels of said vehicle axle for the common, simultaneous control thereof;
   b. a separate sensing means connected to each wheel of said axle for separately sensing the behavior of each said wheel, each sensing means having an output for emitting a control signal when the associated wheel manifests a tendency to lock; and
   c. control means including inputs connected to said outputs of said separate sensing means and an output coupled to said braking pressure reducing means, said control means having a first state for reducing the braking pressure on all the wheels of said vehicle axle by means of said braking pressure reducing means only when the output of each sensing means emits simultaneously said control signal, said control means having a second state for reducing the braking pressure on all the wheels of said vehicle axle by means of said braking pressure reducing means when the output of at least one of said sensing means emits said control signal, said control means further including switch means responsive at least indirectly to a change from a substantially straight line travel of the vehicle to a curved line travel thereof for switching said control means from said first state into said second state at the latest when said vehicle is beginning to be subjected to transverse accelerations exceeding a predetermined value.

2. An antilock control system as defined in claim 1, wherein said switch means comprises an acceleration measuring device for sensing said transverse accelerations.

3. An antilock control system as defined in claim 1, wherein said switch means comprises means associated with the vehicle steering wheel for switching said actuating means from said first state to said second state at predetermined angular positions of said steering wheel.

4. An antilock control system as defined in claim 1, further comprising a reference value generator for generating a reference value from the highest of the speeds of said wheels, each said sensing means including comparator means for comparing a speed value derived from the speed of the associated wheel by said sensing means, with said reference value to provide a slip value and each said sensing means further including means for emitting said control signal when said slip value reaches a predetermined magnitude.

5. An antilock control system as defined in claim 4, wherein storage means are provided for storing the rotational speed values of each said wheel when a predetermined deceleration of said wheels takes place and means are provided to select the largest of said stored values as said reference value.

6. An antilock control system as defined in claim 5, wherein means are provided for causing a new speed value of a wheel to be stored in said storage means when the speed value of this wheel deviates to a predetermined extent from said reference value.

7. An antilock control system as defined in claim 1, said switch means further including means for switching said control means from said first state into said second state after the output of each sensing means has emitted said control signal simultaneously for a predetermined period.

8. An antilock control system as defined in claim 1, wherein said signals are electric signals generated by electric signal generating means, said control means includes a first AND gate, each input of which is connected to an output of said separate sensing means; a first OR gate, each input of which is connected to an output of said separate sensing means; an output forming part of said switch means to emit an electric signal when responding to said curved line travel; a second AND gate having one input connected to the output of said first OR gate and having another input connected to the output of said switch means; and a second OR gate having one input connected to the output of said first AND gate and having another input connected to the output of said second AND gate, said second OR gate has an output connected to said braking pressure reducing means.

9. An antilock control system as defined in claim 8, further including a delay means coupling the output of said first AND gate with said other input of said second AND gate for switching said control means from said first state into said second state after the output of each sensing means has emitted said control signal simultaneously for a predetermined period.

* * * * *

UNITED STATES PATENT OFFICE
CERTIFICATE OF CORRECTION

Patent No. 3,797,892   Dated March 19th, 1974

Inventor(s)  Heinz Leiber

It is certified that error appears in the above-identified patent and that said Letters Patent are hereby corrected as shown below:

In the heading of the patent, line 3, "Teldrix" should be --TELDIX--. Column 2, line 16, after "by" "the" should be --that--. Column 3, line 38, "Rode" should be --Rodi--.

Signed and sealed this 10th day of September 1974.

(SEAL)
Attest:

McCOY M. GIBSON, JR.          C. MARSHALL DANN
Attesting Officer              Commissioner of Patents